(12) United States Patent
Cloutier et al.

(10) Patent No.: US 7,535,407 B2
(45) Date of Patent: May 19, 2009

(54) APPARATUS USING CONTINUOUS-WAVE RADIATION FOR DETECTING AND LOCATING TARGETS HIDDEN BEHIND A SURFACE

(75) Inventors: Paul A. Cloutier, Nassau Bay, TX (US); Delbert R. Oehme, Bryan, TX (US)

(73) Assignee: Prairielands Energy Marketing, Inc., Bismarck, ND (US)

( * ) Notice: Subject to any disclaimer, the term of this patent is extended or adjusted under 35 U.S.C. 154(b) by 0 days.

(21) Appl. No.: 12/076,819

(22) Filed: Mar. 24, 2008

(65) Prior Publication Data
US 2008/0198063 A1     Aug. 21, 2008

Related U.S. Application Data

(62) Division of application No. 10/527,798, filed on Mar. 15, 2005, now Pat. No. 7,362,260.

(51) Int. Cl.
*G01V 3/08* (2006.01)

(52) U.S. Cl. .................. 342/127; 324/326; 324/329; 324/337; 324/637

(58) Field of Classification Search .................. 342/22, 342/127; 324/326, 329, 337, 637
See application file for complete search history.

(56) References Cited

U.S. PATENT DOCUMENTS

| | | | |
|---|---|---|---|
| 3,392,384 A | 7/1968 | Wesch ............................ 343/5 | |
| 3,665,381 A | 5/1972 | Bauer | |
| 3,713,156 A | 1/1973 | Pothier ........................... 343/17 | |
| 3,775,765 A | 11/1973 | Di Piazza et al. ............... 343/5 | |
| 3,808,520 A | 4/1974 | Runge | |
| 4,062,010 A | 12/1977 | Young et al. .................... 343/5 | |
| 4,072,942 A | 2/1978 | Alongi ........................... 343/5 | |
| 4,100,496 A | 7/1978 | Akiyoshi et al. ............. 325/369 | |
| 4,240,027 A | 12/1980 | Larsen et al. .................. 324/57 | |
| 4,271,389 A | 6/1981 | Jacobi et al. ................ 324/58.5 | |
| 4,746,867 A | 5/1988 | Gunton ......................... 324/329 | |
| 4,937,580 A | 6/1990 | Wills .............................. 342/22 | |
| 4,994,789 A | 2/1991 | Harman ........................ 367/93 | |
| 5,051,748 A | 9/1991 | Pichot et al. .................... 342/22 | |
| 5,334,981 A | 8/1994 | Smith et al. .................... 342/27 | |
| 5,357,253 A | 10/1994 | Van Etten et al. ............. 342/22 | |
| 5,363,050 A | 11/1994 | Guo et al. ..................... 324/638 | |
| 5,420,589 A | 5/1995 | Wells et al. .................... 342/22 | |
| 5,557,277 A | 9/1996 | Tricoles et al. ................ 342/22 | |
| 5,592,170 A | 1/1997 | Price et al. .................... 342/22 | |

(Continued)

FOREIGN PATENT DOCUMENTS

GB          917557 A        2/1963

(Continued)

*Primary Examiner*—Ian J Lobo
(74) *Attorney, Agent, or Firm*—Miles & Stockbridge P.C.

(57) ABSTRACT

Continuous-wave radiation is used to detect a target hidden behind a surface. In an embodiment, a transmitter directs a beam of continuous-wave microwave radiation from a transmitting location, and reflected radiation from the target is received at first and second receiving locations closer to the surface than the transmitting location. The transmitting and receiving locations have spatial relationships such that the phase of reflected radiation received at one receiving location is in quadrature with the phase of reflected radiation received at the other receiving location. In an embodiment, direct transmitted radiation is received at the receiving locations in quadrature.

18 Claims, 12 Drawing Sheets

U.S. PATENT DOCUMENTS

| | | | |
|---|---|---|---|
| 5,673,050 A | 9/1997 | Moussally et al. | 342/22 |
| 5,680,048 A | 10/1997 | Wollny | 324/329 |
| 5,819,859 A | 10/1998 | Stump et al. | 175/26 |
| 5,828,331 A | 10/1998 | Harper | 342/22 |
| 5,837,926 A | 11/1998 | Franklin | 102/427 |
| 5,867,117 A | 2/1999 | Gogineni et al. | 342/22 |
| 5,900,833 A | 5/1999 | Sunlin et al. | 342/22 |
| 5,920,285 A | 7/1999 | Benjamin | 342/368 |
| 5,933,014 A | 8/1999 | Hartrumpf et al. | 324/642 |
| 5,942,899 A | 8/1999 | Shrekenhamer et al. | 324/326 |
| 5,969,661 A | 10/1999 | Benjamin | 342/22 |
| 6,002,357 A | 12/1999 | Redfern et al. | 342/22 |
| 6,133,869 A | 10/2000 | McGill | 342/351 |
| 6,445,334 B1 | 9/2002 | Bradley et al. | 342/22 |
| 6,462,696 B1 | 10/2002 | Gorman | 342/22 |
| 6,496,137 B1 | 12/2002 | Johansson | 342/22 |
| 6,512,475 B1 | 1/2003 | Bogatyrev et al. | 342/22 |
| 6,567,036 B1 | 5/2003 | Eckhard | 342/22 |
| 6,587,072 B1 | 7/2003 | Gresham et al. | 342/70 |
| 6,990,317 B2 | 1/2006 | Arnold | 455/59 |
| 2002/0130664 A1 | 9/2002 | Birken et al. | |
| 2002/0196177 A1 | 12/2002 | Johansson et al. | 342/22 |
| 2003/0048104 A1 | 3/2003 | Stolarczyk | 324/337 |
| 2003/0132873 A1 | 7/2003 | Berthelier et al. | 342/22 |
| 2006/0132352 A1* | 6/2006 | Schantz et al. | 342/127 |

FOREIGN PATENT DOCUMENTS

| | | |
|---|---|---|
| JP | 58-223771 | 12/1983 |
| JP | 60-173490 | 9/1985 |
| JP | 63-006481 | 12/1988 |
| JP | 63-304188 | 12/1988 |

* cited by examiner

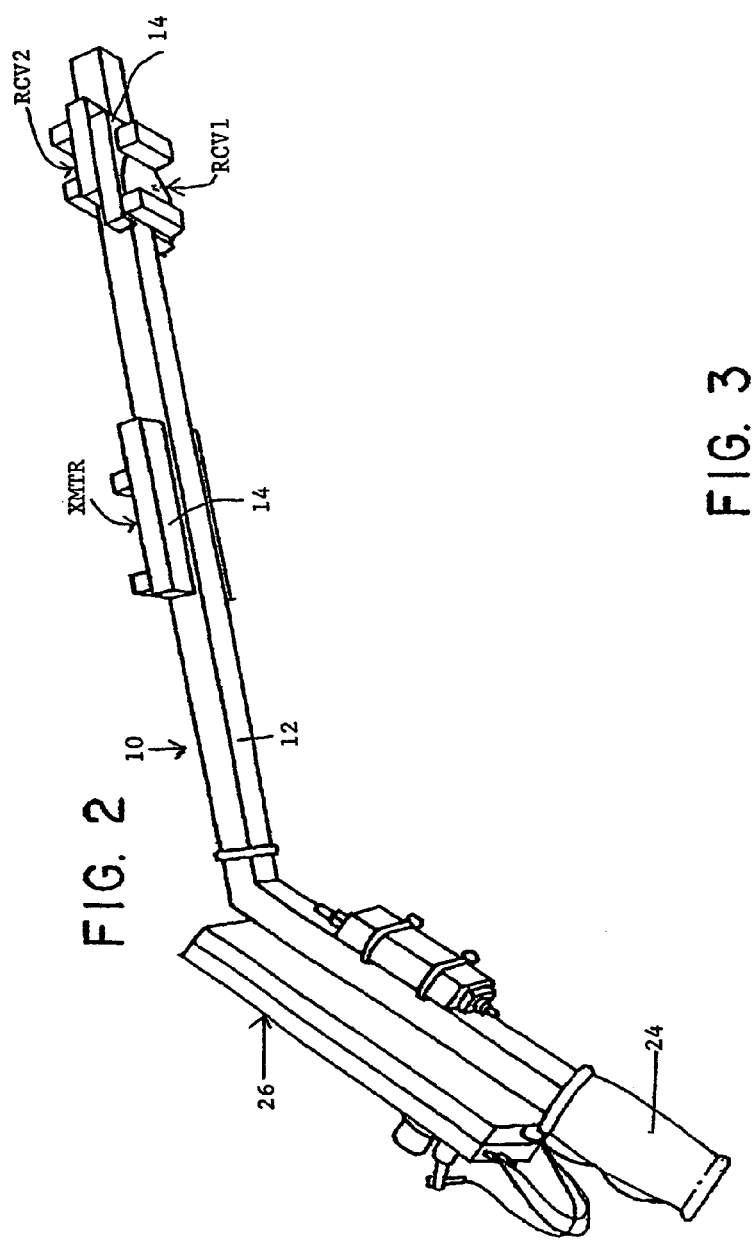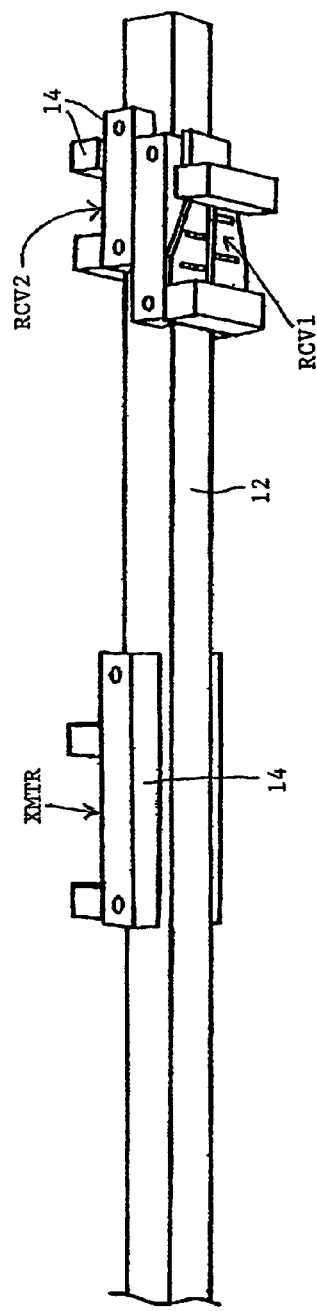

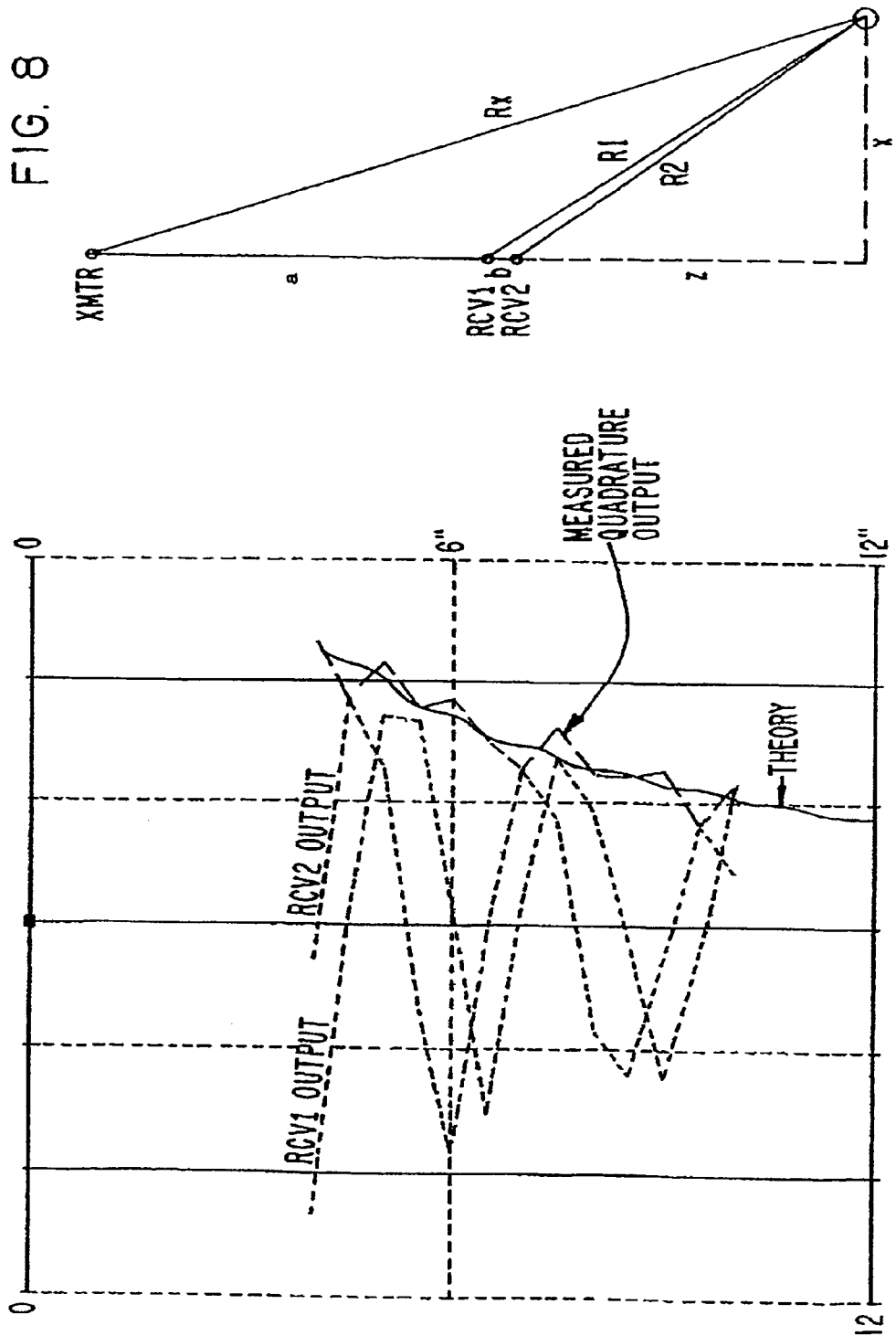

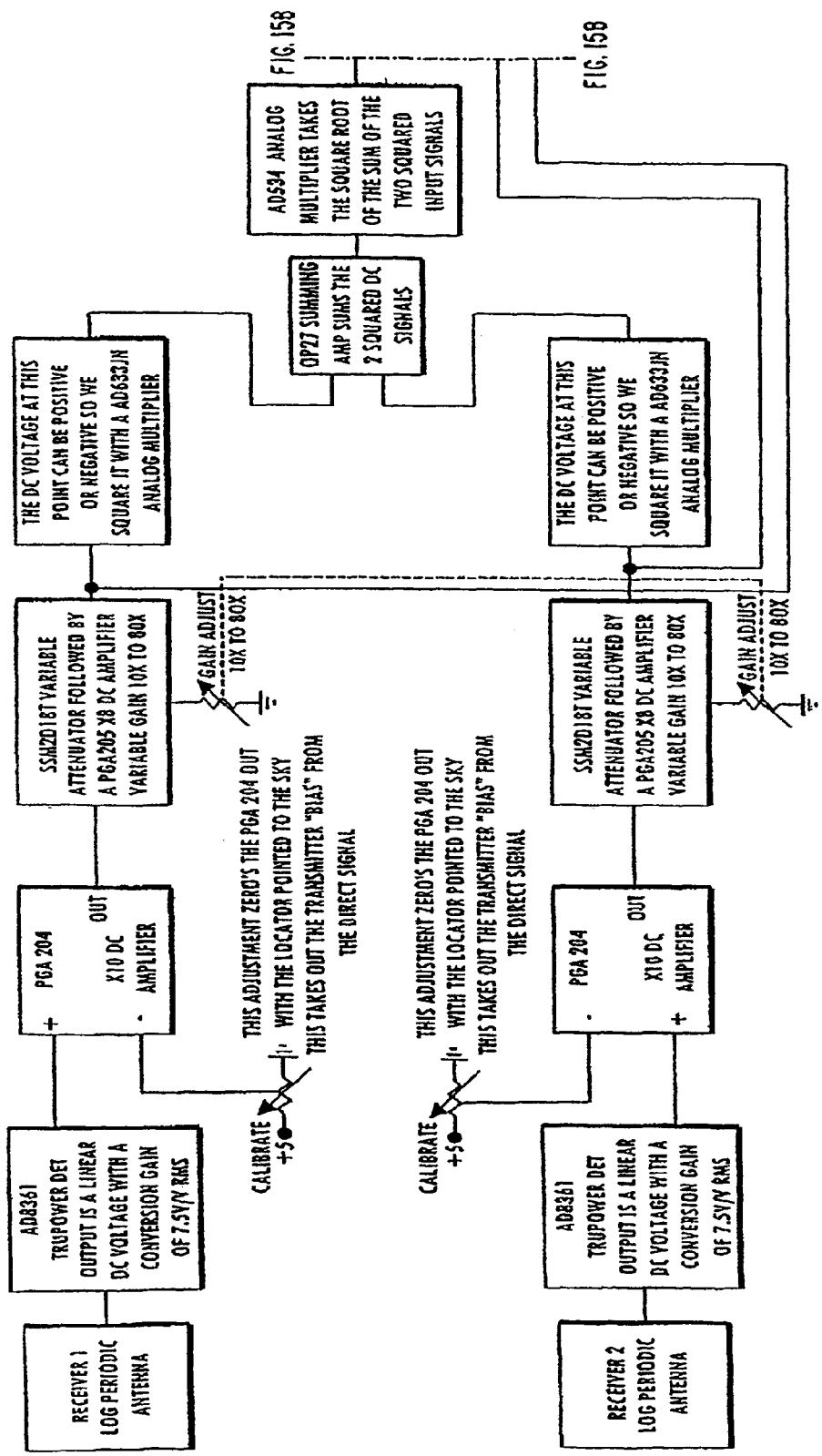

APPARATUS USING CONTINUOUS-WAVE RADIATION FOR DETECTING AND LOCATING TARGETS HIDDEN BEHIND A SURFACE

CROSS REFERENCE TO RELATED APPLICATIONS

This application is a division of application Ser. No. 10/527,798 filed Mar. 15, 2005, now U.S. Pat. No. 7,362,260 which claims the benefit of Provisional Application No. 60/413,757 filed Sep. 27, 2002, and provisional Application No. 60/474,962 filed Jun. 3, 2003, both incorporated herein by reference.

BACKGROUND OF THE INVENTION

This invention is concerned with the detection and location of targets hidden behind a surface, such as a surface of the earth, using continuous-wave radiation.

Although the detailed description of the invention refers to measurement of reflected electromagnetic radiation at microwave wavelengths, the principles of the invention are applicable to other types of continuous-wave systems, such as those using sound waves (e.g., sonar).

Various means and methods have been developed for detection and location of buried metallic and non-metallic objects which rely on the reflectivity of the objects at radar (microwave) wavelengths. These means and methods include devices which attempt to image the objects through beam scanning and determine distance (range) by timing differences between transmitted and reflected pulses (i.e., ground-penetrating radars) as well as devices which attempt to utilize expected differences between background (earth) reflectivity and the reflectivity of the buried object. Both methods are subject to significant difficulties in their ability to locate buried objects (especially non-metallic objects) due to several factors. These include:

(a) presence of other buried materials in surrounding soil (rocks, tree roots, etc.) whose reflectivities are comparable to that of the target object;

(b) rough or uneven terrain surface which produces widely-varying background reflected signals;

(c) for continuous-wave devices, constructive and destructive interference between transmitted and reflected waves;

(d) interference between multi-path reflected signals; and (e) interference between the fundamental frequency and harmonics in the reflected wave.

Although pulsed devices which rely on timing are less subject to interference problems than continuous-wave devices, continuous-wave devices are inherently less complex, require less power, and may be made more easily portable.

BRIEF DESCRIPTION OF THE INVENTION

The following description relates to a continuous-wave device comprising a transmitter and two or more receivers designed to detect and locate buried metallic and non-metallic objects by measurement of reflected microwave radiation, and discloses the means and methods used to overcome or diminish some of the difficulties described above.

The invention will be described with reference to two embodiments which are designed to detect targets beneath the surface of the earth, but it will become apparent in later portions of the description that the invention is useful in detecting targets hidden behind wall surfaces, for example.

Both embodiments of the invention use a transmitter that transmits a beam of continuous-wave radiation and a pair of receivers of such radiation. Predetermined spatial relationships (geometry) of the transmitter and the receivers are provided such that the transmitter is farther from the surface than the receivers and such that a quadrature phase relationship exists for reflected radiation at the receivers. In one embodiment, a quadrature relationship also exists for direct radiation that reaches the receivers from the transmitter.

Although not so restricted, in both embodiments the transmitter and the receivers are mounted on an elongated hand-held rod, with the receivers adjacent to an end of the rod and the transmitter farther from the end of the rod than the receivers. For microwave applications of the invention, directional antennas are used at the transmitter and each of the receivers. In one embodiment, the axis of each beam pattern is along the length of the rod. In another embodiment, parallel axes of the receiver beam patterns are inclined with respect to the length of the rod, and the axis of the transmitter bean pattern is also inclined with respect to the length of the rod, but at a different angle of inclination than that for the receivers.

BRIEF DESCRIPTION OF THE DRAWINGS

The invention will be further described in conjunction with the accompanying drawings, which illustrate preferred (best mode) embodiments, and wherein:

FIG. 2 is a perspective view of the first embodiment;

FIG. 3 is a fragmentary perspective view showing a portion of the first embodiment;

FIG. 7 is another graphical view showing test results of the first embodiment;

FIG. 8 is a diagram showing spatial relationships employed in the first embodiment;

FIGS. 15A and 15B constitute a block diagram showing a circuit that can be used in the second embodiment.

DETAILED DESCRIPTION OF THE INVENTION

First Embodiment

Figure 1:
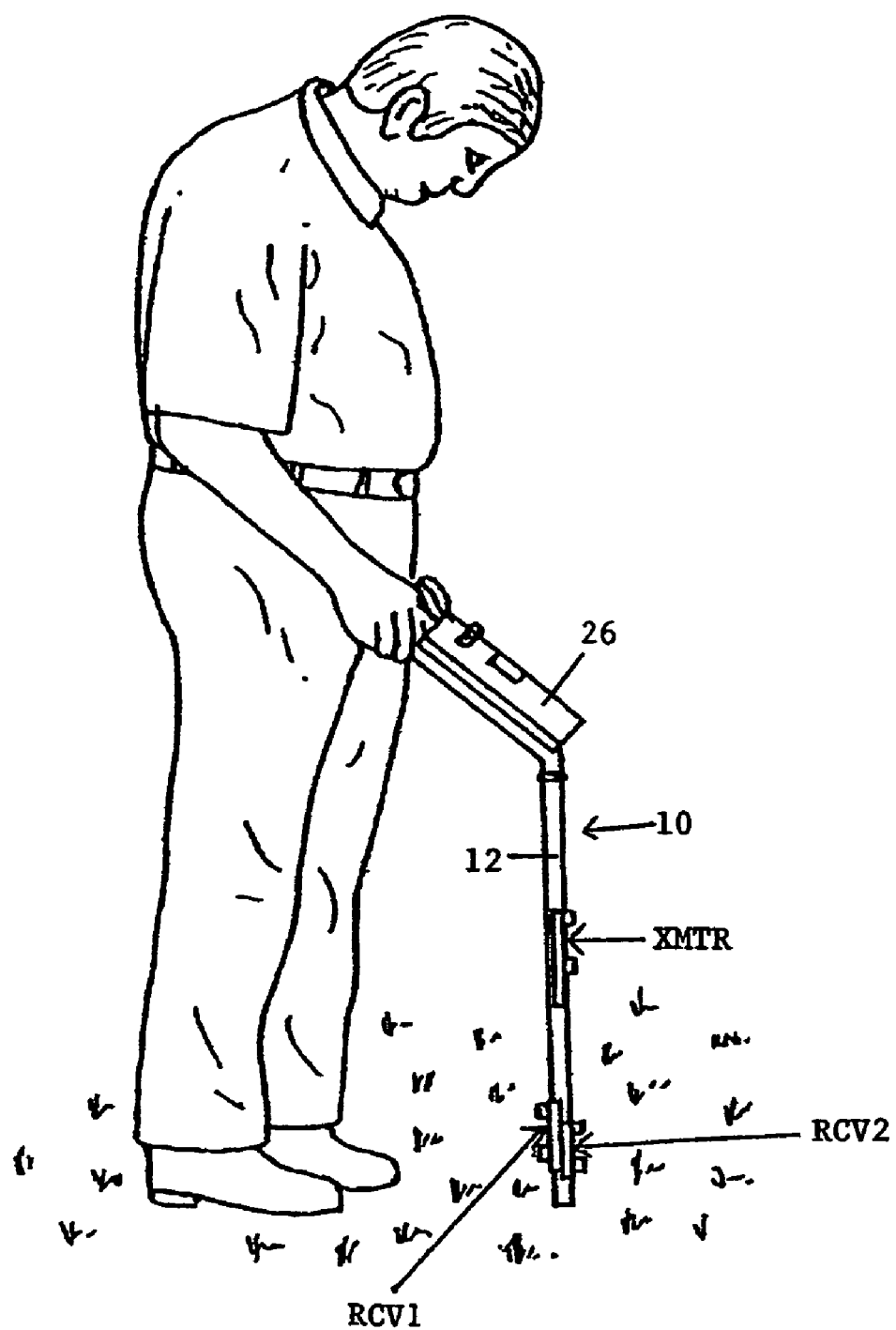
FIG. 1 is a view showing a first embodiment of the invention in use.
Figure 4:
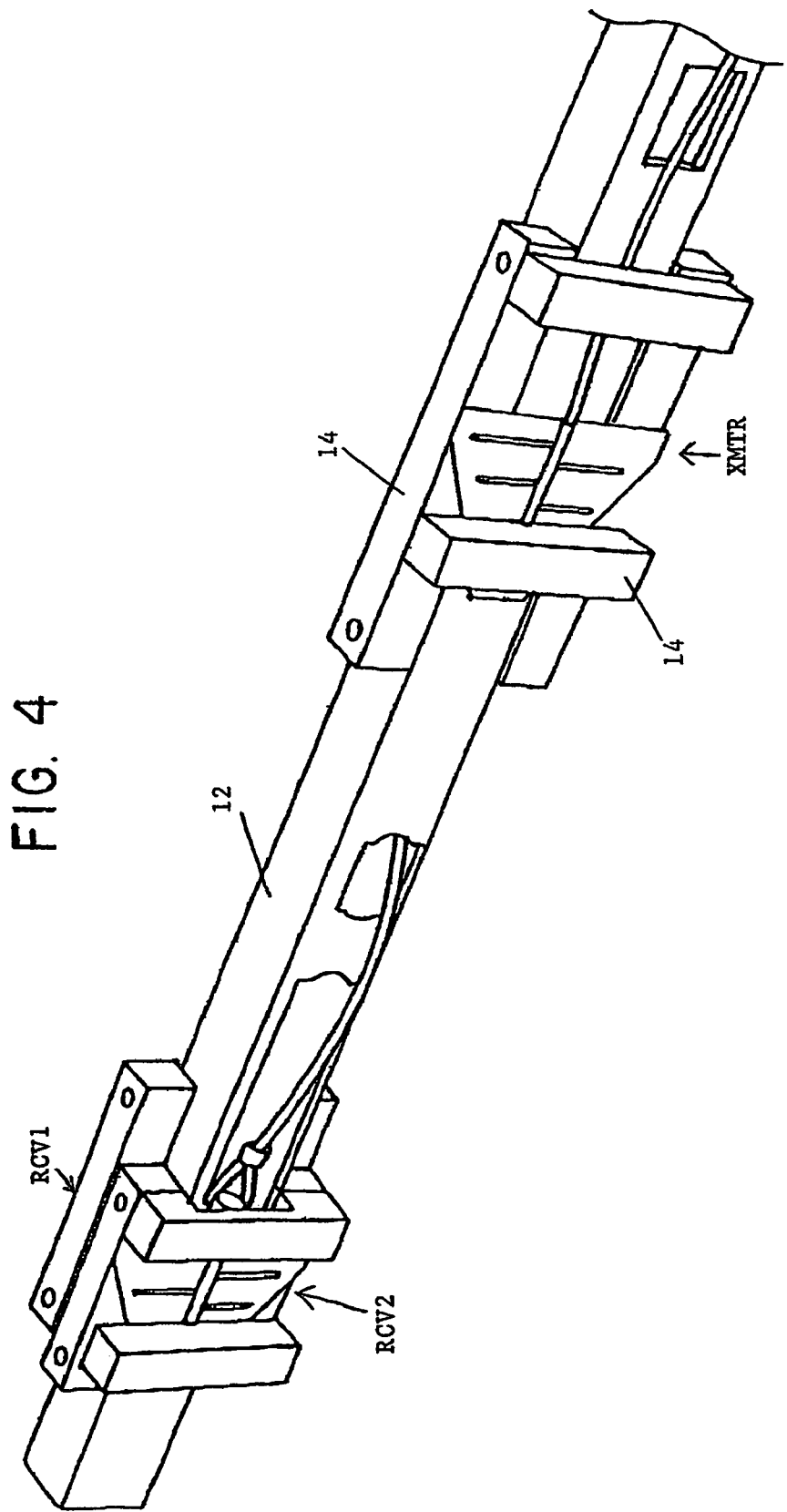
FIG. 4 is a fragmentary perspective view showing another portion of the first embodiment.
Figure 5:
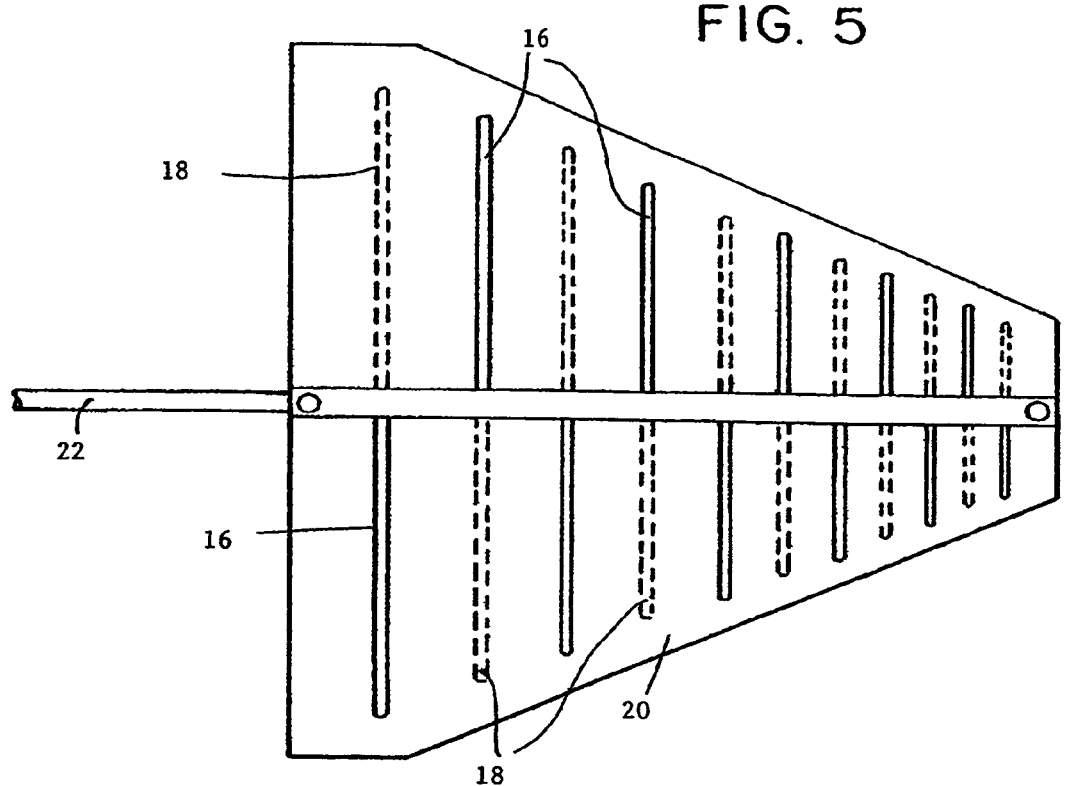
FIG. 5 is a plan view of an antenna that can be used in the invention.

FIGS. 1-5 show apparatus 10 employed in the first embodiment. In this apparatus, there are three antennas, namely, a transmitter antenna XMM and two receiver antennas RCV1 and RCV2. In the later description, the receiver antenna RCV2 referred to as the "top antenna" is actually closer to the ground than the "bottom antenna" RCV1 in the use of the apparatus. All three antennas are mounted on a rod 12, such as a 1-inch square fiberglass tube. Basswood blocks 14 are used to attach the antennas to the tube.

The two receiver antennas are mounted on opposite sides of the rod 12, and in use the top antenna RCV2 is 0.6 inch closer to the ground than the bottom antenna RCV1. The transmitter antenna XMTR is mounted on the same side of the rod as the top antenna RCV2 and is at equal distances from the receiver antennas. For example, the transmitter antenna may be ten inches from the receiver antennas. This distance is not critical, but should be the same for both receiver antennas.

In the apparatus shown, each antenna is a directional log periodic antenna having the gain of a Yagi but in a smaller space. See FIG. 5. The antenna elements 16 and 18 are mounted on opposite sides of a PC board 20. The elements on one side of the board are tied to the elements on the opposite side of the board, which are fed with the center conductor of a coaxial cable 22.

As shown in FIG. 2, the rod is angulated and has a handle 24 at one end that is held by an operator when the apparatus is in use as shown in FIG. 1. Mounted on the rod adjacent to the handle is an electronics unit 26 that includes a source of continuous microwave energy, a battery power supply, one or more readout devices (e.g., visual and/or audible) and various controls (e.g., background null and gain adjust). Typical circuitry for use in the invention will be described later in connection with the second embodiment.

In the use of the apparatus, as shown in FIG. 1, a beam of radiation is transmitted into the ground toward a hidden target and radiation reflected from the target is received by the receivers and produces an output.

Continuous-Wave Transmitter/Receiver Design

Consideration of factors (a) through (e) above leads to a number of constraints in the design of a continuous-wave detector. Factors (a) and (b) lead to a requirement that the transmitter be situated high enough above the terrain surface that, for a reasonably restricted transmitter beamwidth, the transmitter beam will illuminate an area of the ground that is large compared to the size of the non-target irregularities (rocks, etc.) and terrain roughness scale. The same considerations apply to the height requirement for the receiving antenna(s) subject to the two additional requirements that the receiving antenna(s) must be as close as possible to the ground for maximum sensitivity to the reflected signal from the target, and as far as possible from the transmitter to reduce the direct signal.

Factor (c) above suggests that a pair of receiving antennas separated by some appropriate fraction of a wavelength might be used to insure that both receivers can never simultaneously be located at an interference null, while (d) and (e) impact the receiver antenna's beamwidth pattern and tuning characteristics, respectively. Analysis of wave pathlengths and phases indicates that the transmitter antenna must lie above the pair of receiver antennas for the reduction of interference effects.

FIG. 8 shows spatial relationships of the transmitter and the receivers of the first embodiment, and more particularly shows path lengths and phase differences, as follows:

DIRECT PATHS: RCV1: $S1=a$

RCV2: $S2=a+b$

REFLECTED PATHS: *RCV*1: $S1'=Rx+R1$

*RCV*2: $S2'=Rx+R2$ with: $Rx=SQR(x^2+(a+b+z)^2)$ $R1=SQR(x^2+(b+z)^2)$ $R2=SQR(x^2+z^2)$ DIRECT PHASES: *RCV*1: $Ph1=360a/L+Ph0$

*RCV*2: $Ph2=360(a+b)/L+Ph0$ with: L=wavelength and Ph0=constant

REFLECTED PHASES: *RCV*1: $Ph1'=360S1'/L+Ph0$

*RCV*2: $Ph2'=360S2'/L+Ph0$

PHASE DIFFERENCES: *RCV*1: $d(Ph1)=Ph1'-Ph1$ $d(Ph1)=360(S1'-a)/L$

*RCV*2: $d(Ph2)=Ph2'-Ph2$ $d(Ph2)=360(S2'-a-b)/L$

TOTAL PHASE DIFFERENCE (*RCV*1 AND *RCV*2 REFLECTED SIGNALS): $d(Ph1)-d(Ph2)=360(S1'-S2'+b)/L$

At $x=0$: $S1'=(a+b+z)+(b+z)$ $S2'=(a+b+z)+z$ and: $d(Ph1)-d(Ph2)=360(2b)/L$

The reflected signals at RCV1 and RCV2 are in quadrature (90 degrees out of phase) when d(Ph1)−d(Ph2)=90, or when:

$b=L/8$

In accordance with the invention, the receiving antennas are separated by a distance b=L/8 to fix the phase difference between the two receiver antennas at 90° (quadrature) when the antennas are directly above the target. This provides a means of determining the true amplitude of the continuous-wave radiation reflected from the target independent of interference effects. In keeping with the constraints discussed previously, for b<<z, the amplitudes of the reflected signals at RCV1 and RCV2 will be nearly identical, and with 90 degrees phase difference between their addition to the direct signals at RCV1 and at RCV2, which for b<<a are also nearly identical. Hence, if the direct signals at RCV1 and RCV2 are denoted by A1 and A2, with the reflected signals at RCV1 and RCV2 by A1' and A2', the corresponding total signals T1 and T2 may be written:

$T1=A1+A1'*\cos(Phi)$ and $T2=A2+A2'*\cos(Phi+90)$
$=A2+A2'*\sin(Phi)$

If the direct signals A1 and A2 are measured before a target is present and subtracted from outputs T1 and T2, then the average reflected signal amplitude A' (which is nearly equal to A1' and A2') can be found from:

$A'=SQR((T1-A1)^2+(T2-A2)^2)A1'A2'$ since $(\sin(Phi))^2+(\cos(Phi))^2)=1$

Thus the amplitude A' is independent of phase angle Phi (hence without interference effects) when the device is directly above the target (x=0). In the following section, it will be shown that A' should be a monotonic function of target distance (z) below the lower receiver antenna RCV2 for horizontal distances small compared to vertical distance (x<<z).

Transmitted and Reflected Signal Strengths

The amplitude A' described above is a function of the transmitter power and beam pattern, distance and angle from transmitter to the target, target size, shape and microwave reflectivity, and the distance and angle from the target to the receiving antennas. The following analysis considers the strength of the transmitted signal at the target, the reflection by the target, and the reflected signal at the receiving antennas. For simplicity, a cylindrical target of radius Rp is assumed with reflectivity Q. The transmitted signal strength is assumed to fall off as 1/r, and the antenna pattern for transmitter and receiver is that of a log periodic Yagi with measured cosine 12 angular falloff. Since the length of the cylindrical target illuminated increases with distance in the antenna beam pattern, the strength of the reflected signal will fall off more slowly than 1/r, and an arbitrary $(1/r)^n$ is assumed for the reflected signal. In the following, the transmitter signal at 1 meter along the vertical axis is denoted Ax.

Transmitted Signal Strength at Target:

$$At = Ax*((\cos(Alpha)\hat{}12)/Rx \text{ where } \tan(Alpha) = x/(a+b+z)$$

Direct Signal Strengths at Receiver:

$$A1 = Ax/a \text{ and } A2 = Ax/(a+b)$$

Reflected Signal Strength at Receiver:

$$A1' = Q*At*((\cos(Beta1))\wedge 12)*(Ap/R1)\wedge n$$
$$A2' = Q*At*((\cos(Beta2))\wedge 12)*(Ap/R2)\wedge n$$
$$\ldots \overline{\text{where } \tan(Beta1) = x/(b+z)}$$
$$\text{where } \tan(Beta2) = x/z$$

A device based an the described design was fabricated and tested. In the test device, the parameters were: wave freq=2.452897 Ghz (L=12.22 cm.), a=21.6 cm., b=1.528 cm. (L/8), and the exponent n was determined to be 0.5. Test results shown in FIG. 6 were obtained for an unburied PVC pipe in air with Rp=2.54 cm. The dashed curve is a normalized theoretical fit from equations set forth earlier.

Discussion of Results

Figure 6:
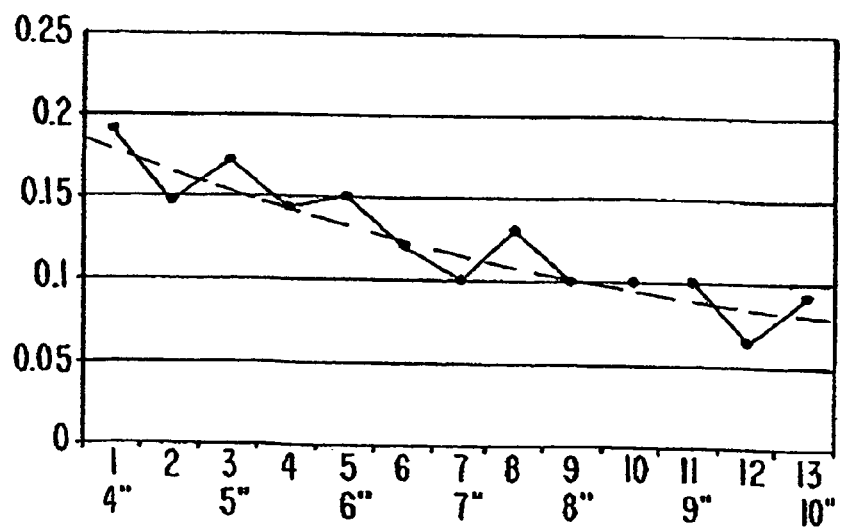
FIG. 6 is a graphical view showing the results of an actual test of the first embodiment.

As shown in the data plot in FIG. 6, the combination of the two receiver outputs to obtain total reflected signal amplitude results in a signal which agrees very well with the theoretical prediction. The average deviation of the combined outputs in this plot is approximately 12.5 millivolts. This small deviation is due to combined effects of reflections over the illuminated target length, small differences in the amplitude of the direct and reflected signals at the two receiving antennas, reflections off of nearby objects, and possible, interference effects of wave harmonics. By contrast, the interference effects at the two receiver antennas cause deviations as large as +/−160 millivolts. Thus the ⅛ wavelength offset between the two receiving antennas to obtain quadrature in the two receiver phases provides a means of determining reflected signal amplitude through elimination of the large deviations caused by interference between the direct signal from the transmitter and the reflected signals. FIG. 7 illustrates that the quadrature output greatly reduces the interference pattern variations seen in either receiver output.

The substantial reduction or elimination of interference effects also allows the possibility of using two or more pairs of quadrature receiving antennas, collinear and spaced some distance apart, to determine target depth. By measuring the true reflected signal amplitude at each pair, the theoretical curve of signal strength vs. target distance may be used to determine target distance independent of absolute signal strength. Signal strength may then be used to determine combined reflectivity and target area, which may be helpful in the determination of target characteristics such as composition (metallic or non-metallic, etc.), size and possibly shape.

Applications

The device described in the previous sections, a combination of a continuous-wave transmitter and two or more pairs of quadrature receiving antennas has a wide range of possible application, including but not limited to:

(a) detection and location of underground metallic and non-metallic pipes, cables, conduits and utility lines (b) detection and location of buried metallic and non-metallic munitions, including mines (c) detection and location of underground anomalies such as tunnels, shafts or graves.

Tests of the device in an urban environment also indicate that the transmitted and reflected beams are capable of penetrating building walls constructed of wood, sheetrock, stone or brick, and that the reflections produced by anomalies within or behind the walls may be used to locate such anomalies. Related applications include:

(a) detection and location of beams, studs, electrical conduit and gas or water pipes within building walls (b) detection and location of moving objects, including human or animal bodies, behind building walls.

Second Embodiment

In the above-described first embodiment of the invention, quadrature of the two receiver phases for reflected radiation eliminates the large deviations caused by interference between the direct signal from the transmitter and the two reflected signals. Additional improvement in performance may be obtained by choice of a geometry in which the transmitter antenna is shifted to the side of the receiver antennas, with the receiver antennas placed so that both the direct wave from the transmitter and the reflected wave from a target below the receiver antennas are 90 degrees out of phase at the two receiver antennas (direct and reflected wave quadrature). In addition, the re-positioning of the receiver antennas away from the center of the transmitter antenna beam greatly reduces the direct signal strength at both receiver antennas. A further benefit of this design is that the reflected signal from the ground surface is not directly below the receiver antennas, and the transmitter antenna beam may be tilted toward the receiver antennas so that the center of the transmitter beam illuminates a point at a desired depth below the ground surface.

A simple embodiment of the design discussed above comprises the transmitter antenna and the upper of the pair of receiver antennas mounted at opposite ends of a portion of a rigid rod or pole which is inclined at an angle (theta) from the vertical, with the second (lower) receiver antenna suspended below the rod or pole by a rigid strut in such a position that it is ¼ wavelength closer to the ground surface than the upper receiver antenna and is also ¼ wavelength closer to the transmitter antenna than the upper receiver antenna.

The second embodiment of apparatus 28 of the invention using this design is shown in FIGS. 9-12, in which the rod 30 is a ¾-inch aluminum tube ("main beam"). 1-inch square fiberglass tubing mounting posts 32 (struts) support the transmitter antenna XKTR and receiver antennas RCV1 and RCV2. The transmitter circuit is designated XC. The mounting posts are pinned to the aluminum with ¼-inch fiberglass tubing and glued in place. Each of the antennas is a directional log periodic type, such as that shown in FIG. 5 described earlier and is enclosed in an ABS plastic box 34. Each receiver antenna has a true power detector at the base of the antenna on the same circuit board. This detector gives a DC voltage output proportional to the detected RF power at the antenna. The transmitter antenna has a short coax cable to the transmitter. The circuitry will be described later.

Figure 9:
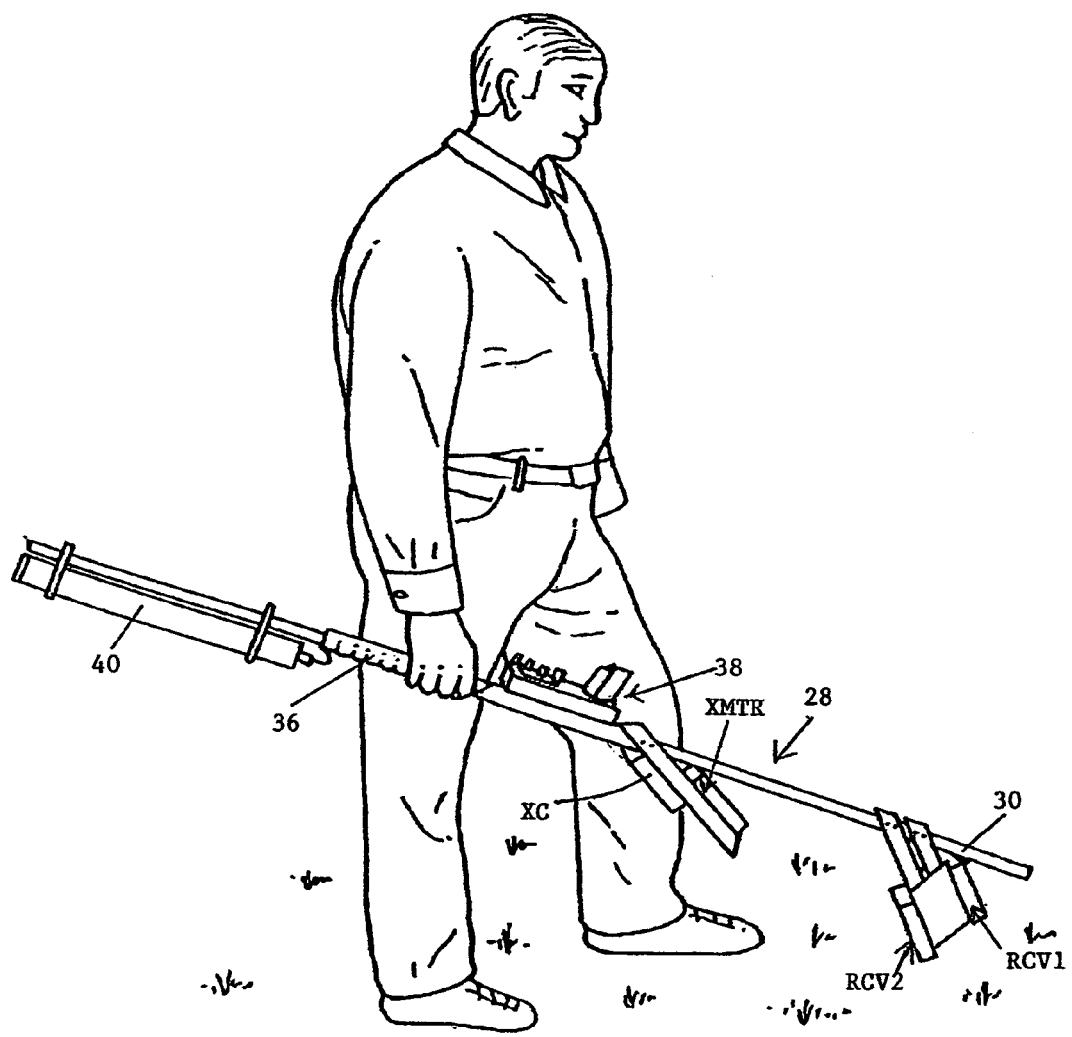
FIG. 9 is a view showing a second embodiment of the invention in use.
Figure 10:
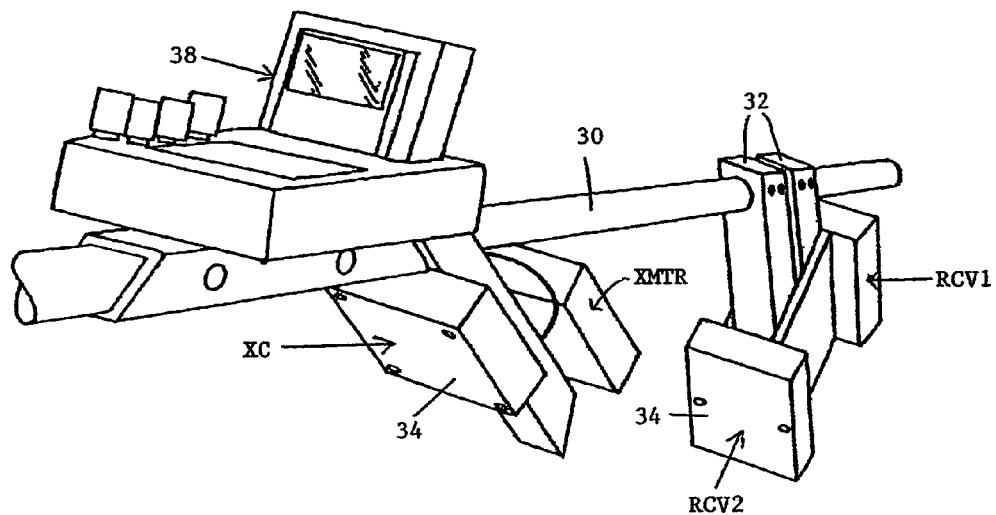
FIG. 10 is a fragmentary perspective view of the second embodiment.
Figure 11:
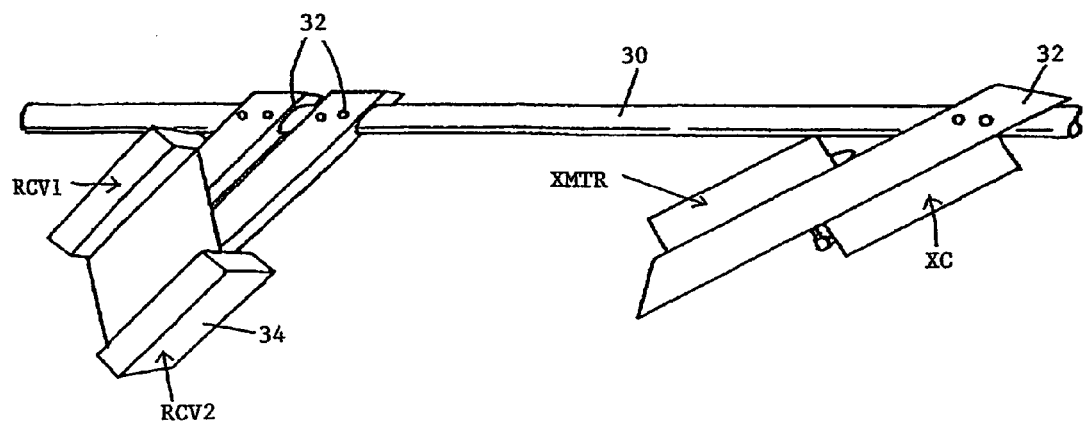
FIG. 11 is a fragmentary elevation view showing a portion of the second embodiment.
Figure 12:
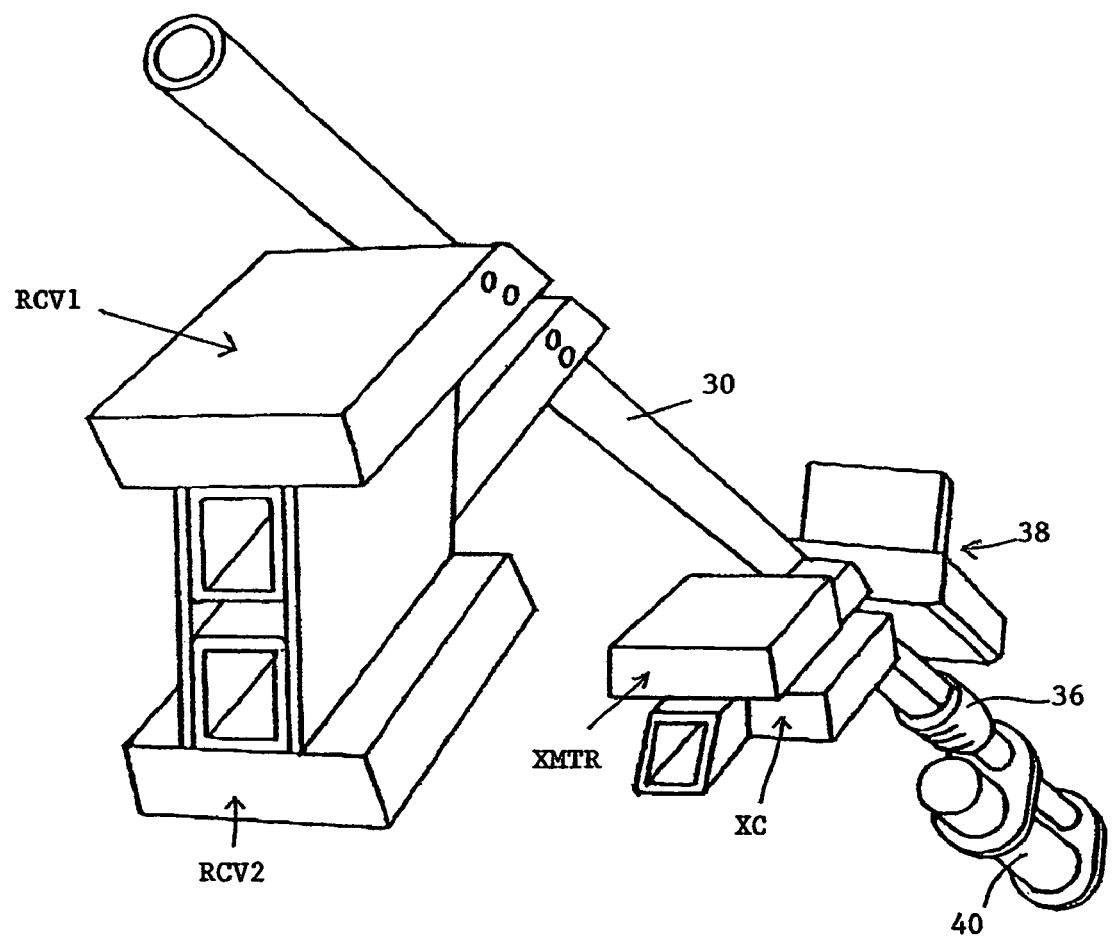
FIG. 12 is a perspective view of the second embodiment.

As shown in FIG. 9, the rod 30 has a handle 36 intermediate its length which is held by an operator when the apparatus is in use. An electronics unit 38 of the type referred to earlier is mounted on the rod between the transmitter and the handle. A battery power supply 40 is mounted on the rod adjacent to the opposite end of the rod and includes batteries that form a counter-weight for the apparatus.

Figure 13:
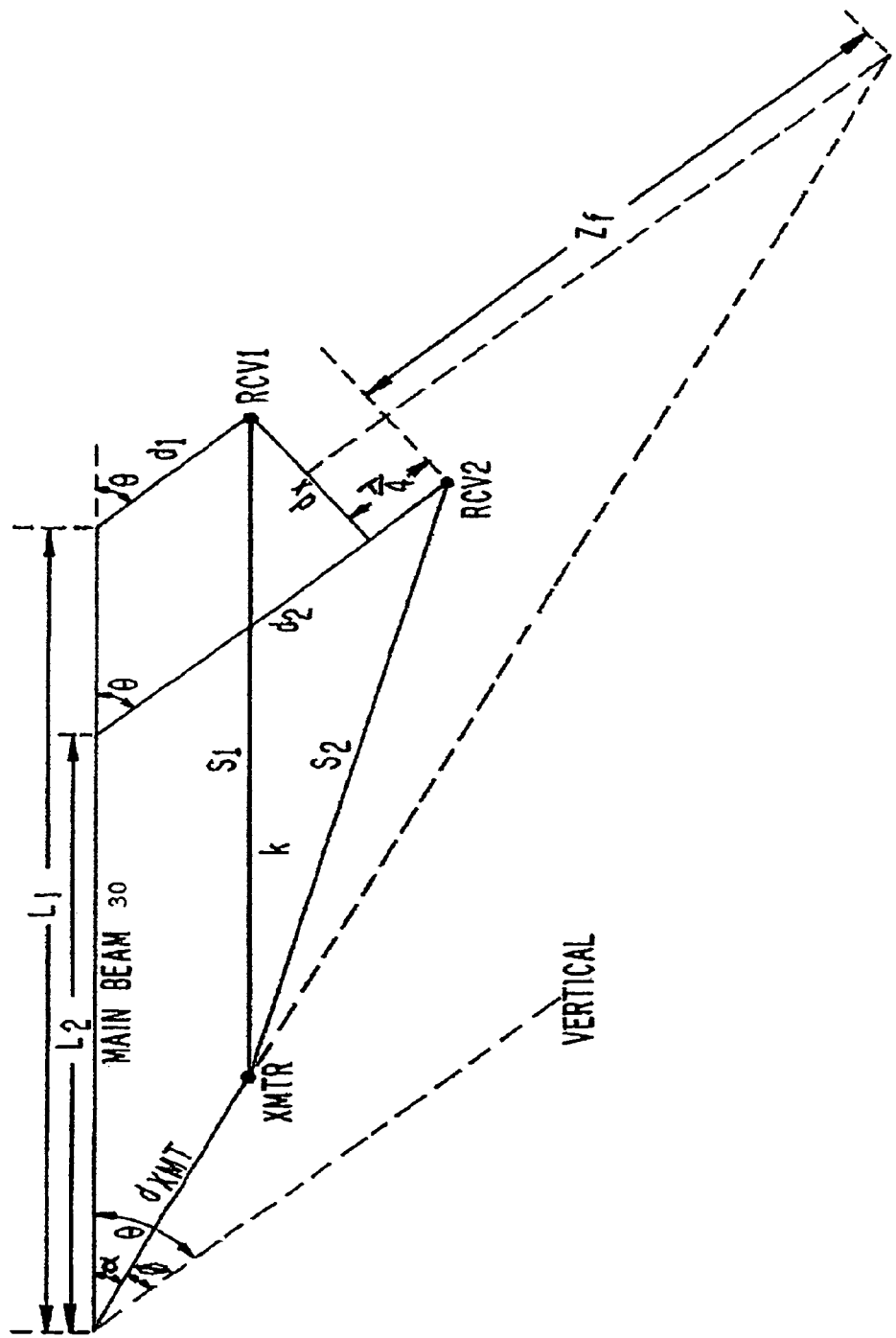
FIG. 13 is diagram showing spatial relationships employed in the second embodiment.
Figure 14:
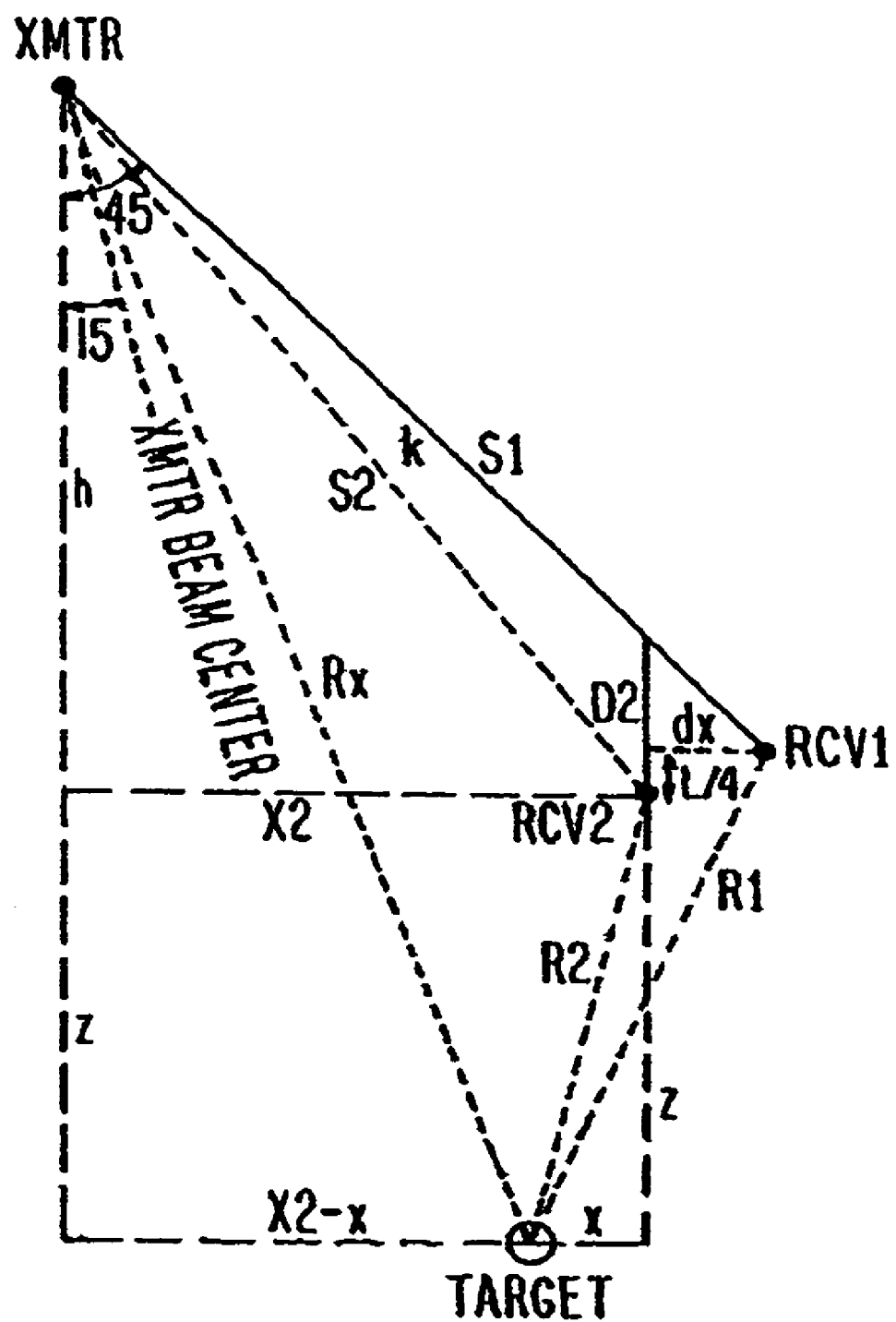
FIG. 14 is another diagram showing spatial relationships employed in the second embodiment.

The geometry (spatial relationships) of such a design is illustrated in FIGS. 13 and 14, with theta, the angle from vertical, set to 45 degrees. This choice of angle was made for comfort of use and balance of the device in the user's hands, and is not otherwise prescribed. The receiver antennas RCV1 and RCV2 are disposed in parallel (vertically in FIG. 14). In general, the exact dimensions of the device required for both direct and reflected wave quadrature may be calculated for an arbitrary angle theta and transmitter wavelength L according to the following relationships:

For chosen angle theta and chosen overall distance S1 between transmitter antenna and upper receiver antenna, the lower receiver antenna will be supported at a vertical distance D2 below the inclined rod from a point at a distance k along the rod from the transmitter antenna, with k and D2 calculated from:

$$k=S1*SQR(1-0.5*L*((1+COS(theta))/(1-(COS(theta))^2))/S1)$$

$$D2=L/4+(S1-k)*COS(theta)$$

The vertical displacement h of the transmitter antenna above the lower receiver antenna is given by:

$$h=S1*COS(theta)+L/4$$

and the horizontal distance dx between the two receiver antennas is given by:

$$dx=(S1-k)*SIN(theta)$$

The angle of tilt of the transmitter antenna from vertical (phi) required for the center of the transmitter beam to cross the vertical mid-line between the two receiver antennas at a distance d below the lower receiver antenna is:

$$phi=ATN((S1*SIN(theta)-dx/2)/(h+d))$$

FIG. 14 shows path lengths and phase differences in the second embodiment, as follows:

DIRECT PATHS: RCV1: S1

$RCU2: S2=S1-L/4$

REFLECTED PATHS: $RCV1: S1'=Rx+R1$ $RCV2: S2'=Rx+R2$ with: $Rx=SQR(X2-x)^2+(h+z)^2)$ $R1=SQR(x+dx)^2+(z+L/4)^2)$ $R2=SQR(x^2+z^2)$ DIRECT PHASES: $RCV1: Ph1=360S1/L+Ph0$ $RCV2: Ph2=360*S2/L+Ph0$ with: L=wavelength and Ph0=constant DIRECT PHASE DIFFERENCE: $d(Phi)=Ph1-Ph2=90$ (QUADRATURE)

REFLECTED PHASES: $RCV1: Ph1'=360*S1'/L+Ph0$ $RCV2: Ph2'=360*S2'/L+Ph0$

REFLECTED PHASE DIFFERENCE: $d(Phi')=Ph1'-Ph2'=360*(R1-R2)/L$ $d(Phi')=360*(SQR((x+dx)^2+(z+L/4)^2)-SQR(x^2+z^2))/L$

For $z>>dx$, at $x=-dx/2$:

$d(Phi')=90$ (QUADRATURE)

Thus in this preferred design, both the direct signals and the reflected signals at RCV1 and RCV2 are in quadrature (90 degrees out of phase) when the target is along a vertical line mid-way between the two receiver antennas.

As shown, the transmitter antenna is tilted 15 degrees from the vertical, corresponding to the center of the transmitter beam crossing the vertical mid-line of the two receiver antennas at a point 15 inches below the RCV2 antenna for S1=12.00 inches.

Selection of the various parameters ($\theta$, $S_1$, $d_1$, and $z_f$) specifying the instrument geometry involves trade-off between instrument size, balance and ease of handling, and expected target burial depth. The choices of parameters and factors involved in their selection are discussed below.

Transmitter-Receiver Distance ($S_1$) and Angle from Vertical ($\theta$)

Since both receiver antennas RCV1 and RCV2 are always vertical, selection of $S_1$ for any particular value of $\theta$ determines both the horizontal displacement between the transmitter antenna and the receiver antennas and the height of the transmitter above the ground. As previously discussed, the transmitter height above the ground should be sufficient for the transmitted beam to illuminate a spot on the ground whose area is much larger than that of irregularities on the ground or at shallow depths below it. This produces an average ground background which remains relatively constant, since it averages over many irregularities. However, the transmitter antenna should be far enough away from the feet of the user that the user's a feet do not produce reflections in the process of walking normally while carrying the instrument. Likewise, the combination of $S_1$ and $\theta$ should position the two receiver antennas RCV1 and RCV2 close enough to the buried target to receive a strong reflected signal, but high enough above the ground surface to average over surface irregularities reflections. A natural design scheme places the balance point at the user's hand, with the batteries providing a rear counter-weight for the weight of the antennas and electronics. A practical limit of 52 inches was chosen for overall length, and experimenting with various combinations of $S_1$ and $\theta$ for the required battery and instrument weights led to a selection of $S_1=12$ inches and $\theta=45°$ as the optimum configuration for all requirements.

Distance of RCV1 Antenna Below Main Support Beam ($d_1$)

This distance depends entirely on the physical dimensions of the rectangular box enclosing the receiver antenna RCV1 and associated rf detector. At θ=45°, the minimum possible distance between the main support beam and the center of the receiver antenna RCV1 was $d_1$=3.5 in. with $d_2$ calculated to be 8.42 in.

Focus Depth of Transmitter Beam ($Z_f$)

The transmitter and receiver antennas beam patterns are identical sharply focused around the forward direction with power (or sensitivity) dropping to 50% at +/−19° about the forward axis. Since the receiver antennas are always vertical in operation, the maximum reflected wave signal strength at the receiver antennas will be obtained when the target is along a vertical line mid-way between the two receiver antennas and is illuminated at the center of the transmitter antenna beam. Thus, for an expected average target burial depth, the transmitter antenna angle from vertical θ may be adjusted to have the antenna beam center cross the vertical line between RCV1 and RCV2 at the expected target distance. In the case of mines, the expected burial depth is shallow (3 to 12 inches), whereas in the case of utility lines and pipes, burial may be expected to be deeper (12 to 36 inches). For test purposes, a value of $Z_f$=15 inches was chosen, resulting in θ=15° and $d_{XMT}$=4.95 inches, with $L_1$=13.82 inches and $L_2$=8.56 inches.

Instrument Set-up and Operation

Figure 15B:
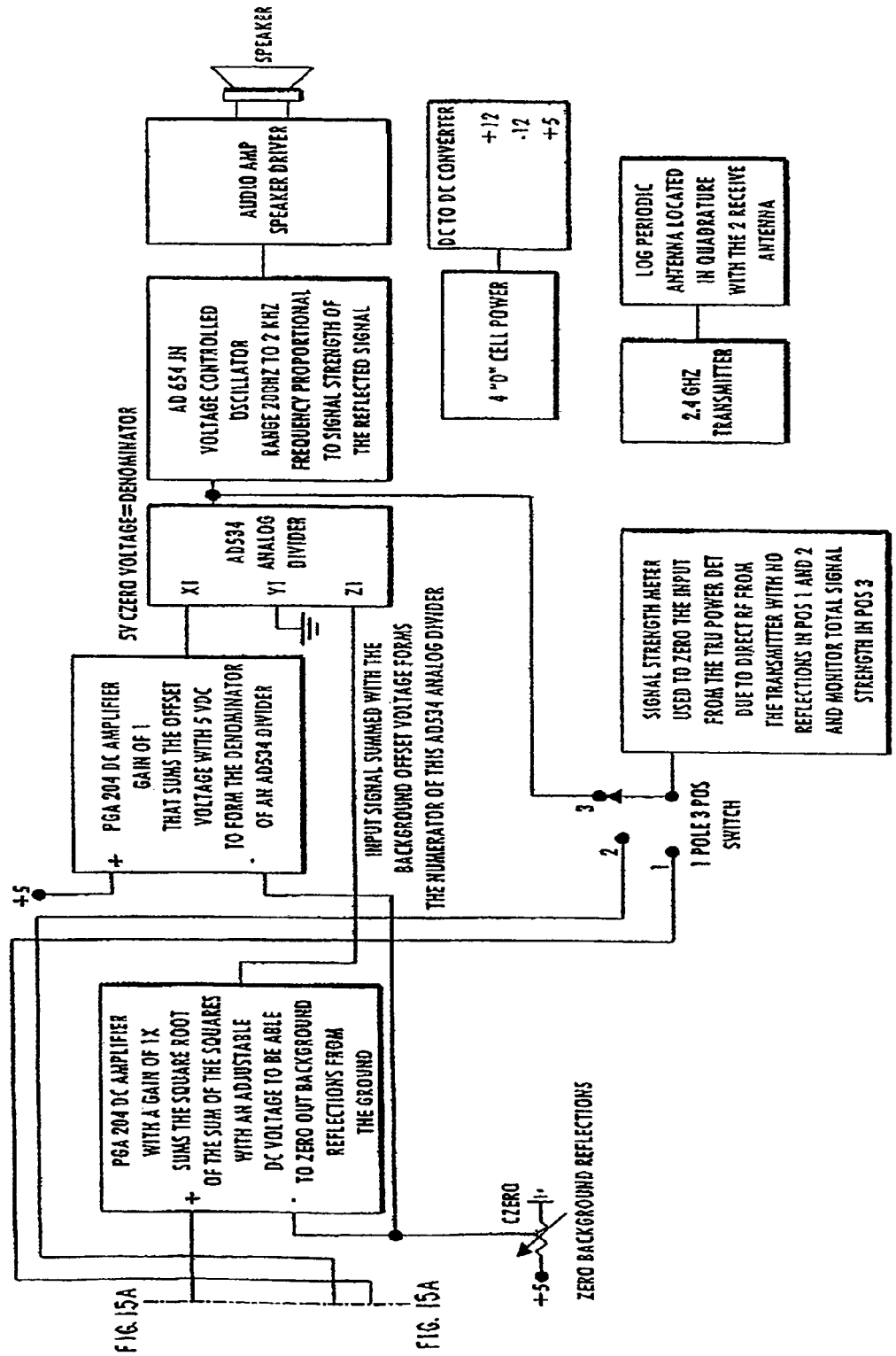

As shown in FIGS. 15A and 15B, the instrument output consists of an analog voltage (0-10 v.d.c.) which drives both a voltage controlled oscillator (VCO) and a voltmeter. The output voltage $V_{out}$ is developed from the two receiver r.f. outputs from RCV1 (V1) and RCV2 (V2) through a series of amplifiers and summing circuits, as described below:

(A) Both receiver antenna (RCV1 and RCV2) outputs are measured in power detectors whose output voltages A1 and A2 are inputs to difference amplifiers with ×10 gain. The other inputs to the difference amplifiers are voltages from trim pots $C_1$ and $C_2$. The outputs from the two difference amplifiers are thus $10(A_1-C_1)$ and $10(A_2-C_2)$.

(B) These outputs go to two variable gain amplifiers with adjustable gain f, whose outputs are $10f(A_1-C_1)$ and $10f(A_2-C_2)$.

(C) These outputs are squared, then summed together and the square root of the resultant sum obtained. This voltage $V_0$=SQR[$(10f(A_1-C_1))^2+(10f(A_2-C_2))^2$] which is equivalent to $V_0$=10f SQR[$(A_1-C_1)^2+(A_2-C_2)^2$]

(D) The output $V_o$ and an offset voltage $C_o$ from a trim pot are inputs to a difference amplifier whose output is $V_o-C_o$.

(E) The output $V_o-C_o$ is then input to a variable gain amplifier whose gain g is set to: $g=10/(10-C_o)$ which sets the output to the meter and VCO so that their full range is scaled (0-10 v) as $V_o$ varies from $C_o$ to $ZC_o$.

The instrument is set up for operation in the following steps:

1. Calibration for Direct Signals at RCV1 and RCV2

With the antennas pointed upward-at the sky, (a) the meter input is switched to the output developed in step (B) for RCV1, which is $10f(A_1-C_1)$ and the voltage $C_1$ is adjusted in the variable pot until the meter reading is 0 (i.e., $C_1=A_1$). This pot setting is held for RCV1.

(b) meter input is switched to output for RCV2, which is $10f(A_2-C_2)$ Pot voltage $C_2$ is adjusted until meter reading is 0 ($C_2=A_2$) and pot setting is held for RCV2.

(c) Meter input is switched to the output from step (D), which is $V_o-C_o$.

2. Neutralization of Earth Background

With the device held in normal operating position, with antennas pointed toward the ground in a location assumed to have no nearby buried targets, (a) set pot adjusting voltage $C_o$ to mid-range (b) adjust variable gain f until meter reading is zero (c) start research for buried objects, adjusting pot controlling $C_o$ as squelch control to compensate for changes in earth background with terrain changes (gravel, bare earth, grass, etc.)

While preferred embodiments of the invention have been shown and described, it will be apparent that changes can be made without departing from the principles and spirit of the invention, the scope of which is defined in the accompanying claims.

What is claimed is:

1. Apparatus for detecting a target hidden behind a surface, comprising:
   a transmitter that transmits a beam of continuous-wave radiation;
   a first receiver disposed to receive such radiation reflected from a target; and
   a second receiver disposed to receive such radiation reflected from the target, wherein
   the receivers are spaced from the transmitter and are spaced from one another according to predetermined spatial relationships such that the electrical signal phase of reflected radiation received by the first receiver is in electrical signal quadrature with the electrical signal phase of reflective radiation received by the second receiver, and wherein the apparatus further comprises circuitry that combines signals derived from the receivers to produce an output.

2. Apparatus according to claim 1, wherein the output corresponds to the square root of the sum of two squared signals derived from the receivers.

3. Apparatus according to claim 1, wherein the spatial relationships are such that the receivers receive direct radiation from the transmitter before radiation reaches the target.

4. Apparatus according to claim 3, wherein the electrical signal phase of direct radiation received by the first receiver is in electrical signal quadrature with the electrical signal phase of the direct radiation received by the second receiver.

5. Apparatus according to claim 1, wherein the radiation is microwave radiation and each of the transmitter and the receivers includes an antenna with a directional beam pattern.

6. Apparatus according to claim 5, wherein the spatial relationships are such that the beam patterns extend in substantially the same direction.

7. Apparatus according to claim 6, wherein the microwave radiation has a predetermined frequency and the receivers are separated by a distance L/8, where L is the wavelength of the radiation.

8. Apparatus according to claim 5, wherein the beam patterns of the receivers are substantially parallel and the beam pattern of the transmitter is inclined with respect to the beam patterns of the receivers.

9. Apparatus according to claim 8, wherein the microwave radiation has a predetermined frequency, and the apparatus is constructed such that, in use, one of the receivers is a quarter wavelength closer to the surface than the other receiver.

10. Apparatus according to claim 5, wherein the transmitter and the receivers are mounted on an elongated support with the receivers adjacent to an end of the support and the transmitter spaced from the end of the support.

11. Apparatus according to claim 10, wherein the support comprises a rod, the transmitter and the first receiver are mounted on a same side of the rod and the second receiver is mounted on an opposite side of the rod, and both receivers are the same distance from the transmitter.

12. Apparatus according to claim 11, wherein the apparatus is constructed such that, in use, the rod is oriented substantially perpendicularly to the surface, with the end of the rod adjacent to the surface.

13. Apparatus according to claim 12, wherein the rod has a handle constructed to permit an operator to hold the rod oriented substantially perpendicularly to the surface.

14. Apparatus according to claim 13, wherein the rod has an electronics unit mounted thereon that includes a source of radiation energy, a readout device, a power supply, and controls.

15. Apparatus according to claim 5, wherein the transmitter and the receivers are supported on an elongated rod with the receivers adjacent to an end of the rod and the transmitter spaced from the end of the rod, the transmitter and the receivers are disposed at a same side of the rod, and the apparatus is constructed such that, in use, the receivers are adjacent to the surface, the transmitter is remote from the surface, and the rod is inclined to the surface.

16. Apparatus according to claim 15, wherein the rod has a handle and has an electronics unit thereon between the handle and the transmitter.

17. Apparatus according to claim 16, wherein the rod has a counter-weight adjacent to its opposite end.

18. Apparatus according to claim 17, wherein the electronics unit has a source of radiation energy, a readout device, and controls, and the counter-weight is part of a power supply for the apparatus.

* * * * *